May 27, 1930.  F. S. CARR  1,760,834
NUT AND SCREW FASTENING
Filed July 22, 1925
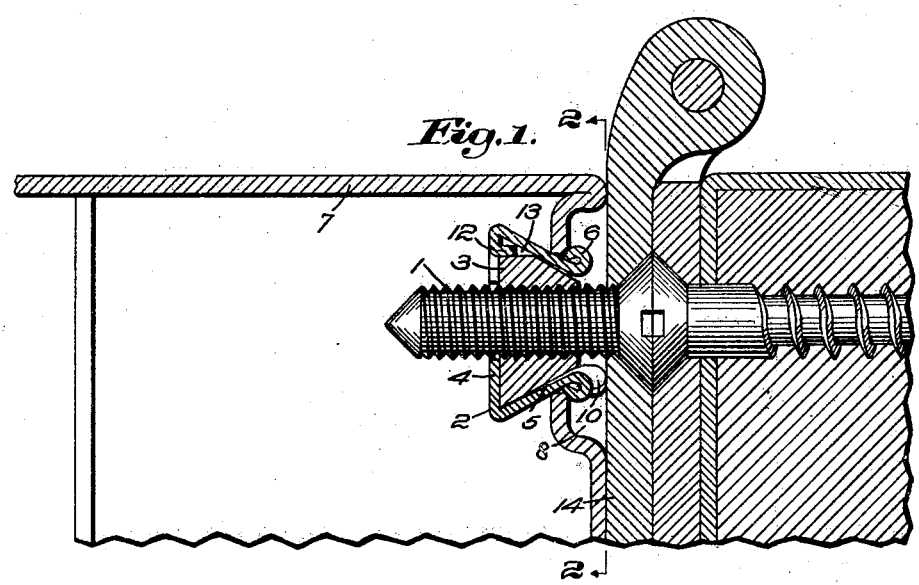
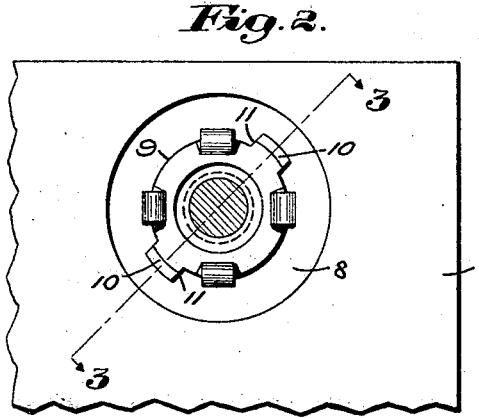
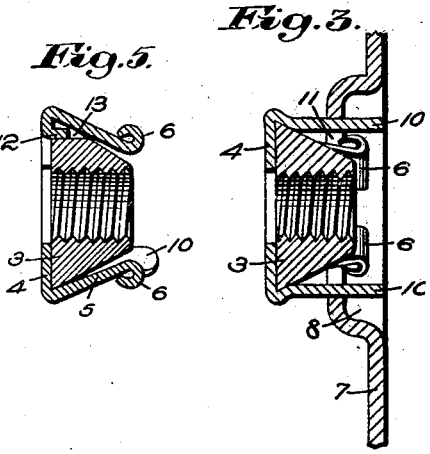
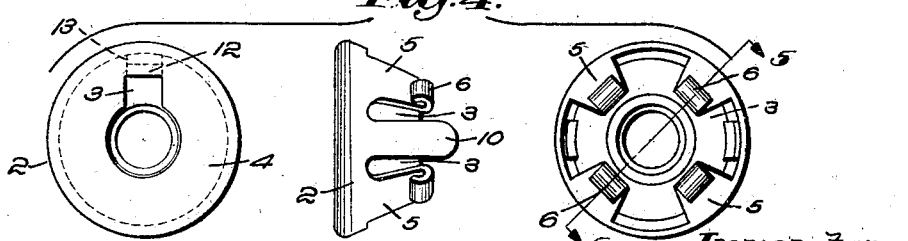
Inventor:
Fred S. Carr, Patented May 27, 1930

1,760,834

UNITED STATES PATENT OFFICE

FRED S. CARR, OF NEWTON, MASSACHUSETTS, ASSIGNOR, BY MESNE ASSIGNMENTS, TO UNITED-CARR FASTENER CORPORATION, OF CAMBRIDGE, MASSACHUSETTS, A CORPORATION OF MASSACHUSETTS

NUT AND SCREW FASTENING

Application filed July 22, 1925. Serial No. 45,267.

This invention aims to provide an improved nut and screw fastening device.

In the drawings, which illustrate a preferred embodiment of my invention:

Figure 1 is a plan section, partly in elevation, showing the use of a nut and screw fastening device in connection with securing a hinge to a metal door frame;

Fig. 2 is a section on the line 2—2 of Fig. 1;

Fig. 3 is a section on the line 3—3 of Fig. 2, the screw being omitted;

Fig. 4 includes a rear, side and front elevation of the nut unit; and

Fig. 5 is a section of the nut unit taken through the resilient fingers to show their normal relation to the nut.

Referring to the drawings, I have illustrated a nut and screw fastening device in connection with securing the hinge of a door to a metal frame. It will be understood, however, that the fastening device illustrated may be used for securing other parts together, even to securing two pieces of sheet metal together as shown in other co-pending applications filed herewith.

The fastening elements include a screw 1 and a nut unit including a nut-holder 2 and tapered nut 3, into which the screw may be threaded, as illustrated in Fig. 1.

The holder 2 may be pressed from a single piece of metal to present a base 4 against which the larger end of the nut may be seated. A plurality of fingers 5 extend from the base and are spaced about the peripheral wall of the nut, as illustrated in Fig. 4. These fingers are squeezed against the nut adjacent to the base 4 of the holder for a portion of their length and they then are gradually spaced away from the outer wall of the nut (Fig. 5) to permit contraction and expansion thereof. At the outer or free end of each finger is provided an outwardly curved reversely bent portion 6, which snaps over the face of a support as more fully hereinafter described.

Thus the nut is secured to the holder so that it is rigidly held thereby and cannot become disassembled therefrom when not in use. By rigidly assembled, I do not mean that there cannot be slight play of the nut to allow for manufacturing tolerances, but I use the word to distinguish from that type of device where there is provided substantial shifting of the nut relative to the holder to permit alignment of the nut and screw.

The sheet metal frame 7 of the automobile body, or the like, is provided with a recessed portion 8 (Fig. 1) having an aperture 9 in the bottom into which the nut unit may be snapped from the inner face of the support, as shown. During engagement with the support, the resilient fingers 5 contract and pass through the aperture 9 in the frame 7 and the reversely bent portions snap over and rest against the outer face of the recessed portion to hold the unit in place.

To prevent rotation of the unit as a whole relative to the support when the screw is being threaded into the nut 3, the holder is provided with two oppositely disposed fingers 10, 10 which extend from the base 4 and pass through notches 11, 11 formed at opposite sides of the aperture 9 in the recess 8, as shown in Figs. 2 and 3. Rotation of the nut 3 relative to the holder 2 is prevented by providing a tongue 12 and groove 13. The tongue is formed from the base 4 and extends into the groove cut into the nut 3, as best illustrated in Figs. 1 and 4.

As illustrated in Fig. 1, the screw 1 passes through a hole in the hinge 14 and is threaded into the nut to draw the hinge flush against the supporting frame 7, thereby forming a strong and rigid fastening means to support a door or the like.

The recess 8 formed in the frame 7 provides a space between the frame and the inner face of the hinge 14, into which the ends of the fingers 5 and 10 may project without interfering with the hinge.

This type of fastening is decidedly better than the usual wood screw heretofore used and screwed into a wooden frame back of the metal covering, because in practice it has been found that strain on the wood screws loosened them or pulled them out of the wood entirely. By use of the nut and screw fastener herein described, such trouble is prevented because the machine screw cannot easily be pulled out of a metal nut, nor can the nut unit be disengaged from the frame. The direction of pull is such that the tendency is to wedge the unit tightly against the inner edge of the wall surrounding the aperture in the support.

While I have shown and described a preferred embodiment of my invention, it will be understood that changes involving omission, substitution, alteration and reversal of parts and even changes in the mode of operation, may be made without departing from the scope of my invention, which is best described in the following claims.

Claims:

1. A fastening element comprising a nut unit including a nut-holder having a base portion and an inwardly tapered side wall, said side wall being slit to provide a number of yieldable fingers having means at their free ends for attaching the nut-holder to a support and a nut of substantially the same height as said fingers, said nut being seated upon said base and held in assembly with the holder by said tapered side wall and means providing a clearance between the side wall of the nut and the yieldable fingers to permit contraction of said fingers.

2. A fastening element comprising a nut unit including a nut-holder, a nut rigidly and non-rotatably secured to said holder, a plurality of resilient fingers spaced about the periphery of said nut and spaced away from the peripheral wall of said nut to permit contraction of said fingers, an outwardly extending reversely bent portion presented by each of said fingers and a finger presented between two of said resilient fingers for interlocking engagement with a support when said unit is secured thereto, thereby to prevent turning of the unit relative to the support.

3. A fastener element comprising a nut unit including a nut-holder, a nut rigidly and non-rotatably secured to said holder, a plurality of resilient fingers spaced about the periphery of said nut and spaced away from the peripheral wall of said nut to permit contraction of said fingers, an outwardly extending reversely bent portion presented by each of said fingers, and a plurality of projections extending along the nut between said fingers for interlocking engagement with notches in a support to prevent turning of the unit relative to the support when secured thereto.

4. A fastening element comprising a generally tapered nut unit including a holder having a base, a generally circular nut seated upon said base and having a tapered side wall, means rigidly securing said nut to said holder, yieldable fingers presented by the holder at intervals around the side wall of the nut and spaced therefrom, said fingers having means at their free ends for securing said holder to a support, a tongue presented by one of said parts and cooperating with a groove presented by the other part to prevent relative rotation between the nut and holder.

In testimony whereof, I have signed my name to this specification.

FRED S. CARR.